(12) United States Patent
Kim (10) Patent No.: US 12,358,149 B2
(45) Date of Patent: Jul. 15, 2025

(54) AUTOMATIC REMOVAL SYSTEM FOR RESERVOIR CAP

(71) Applicants: Hyundai Motor Company, Seoul (KR); Kia Corporation, Seoul (KR)

(72) Inventor: Jun Young Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 292 days.

(21) Appl. No.: 17/897,316

(22) Filed: Aug. 29, 2022

(65) Prior Publication Data

US 2023/0192039 A1 Jun. 22, 2023

(30) Foreign Application Priority Data

Dec. 21, 2021 (KR) .................. 10-2021-0183978

(51) Int. Cl.
*B25J 9/16* (2006.01)
*B25J 13/08* (2006.01)
(Continued)

(52) U.S. Cl.
CPC ........... *B25J 9/1697* (2013.01); *B25J 9/1679* (2013.01); *B25J 13/08* (2013.01); *B25J 15/0038* (2013.01);
(Continued)

(58) Field of Classification Search
CPC ... B25J 9/06; B25J 9/065; B25J 9/1612; B25J 9/1633; B25J 9/1669; B25J 9/1679; B25J 9/1687; B25J 9/1694; B25J 9/1697; B25J 15/08–12; B25J 15/0009; B25J 15/0023–0042; B25J 15/02–0293; B25J 13/085; B25J 19/023; B67D 7/0401; B67D 2007/0403; B67D 2007/0405; B67D 2007/0407; B67D 2007/0411; B67D 2007/0415; B67D 2007/0417; B67D 2007/043–0438; G05D 2219/40613; B60S 5/00–046

See application file for complete search history.

(56) References Cited

U.S. PATENT DOCUMENTS

2015/0362350 A1* 12/2015 Miller ................... G01F 23/802
73/290 R
2016/0207196 A1* 7/2016 Ohnishi ................. B25J 9/1633
(Continued)

FOREIGN PATENT DOCUMENTS

CN 105666502 B * 7/2018 ............ B25J 11/008
CN 112299359 A * 2/2021 .............. B67D 7/04
KR 10-2009-0042515 A 4/2009

*Primary Examiner* — Spencer D Patton
(74) *Attorney, Agent, or Firm* — Fox Rothschild LLP (57) ABSTRACT

An automatic removal system for a reservoir cap is provided. The system includes a removal robot including a polyarticular robot arm, a finger that is installed at an end of the robot arm to move forwards and backwards through a cylinder and grips or releases the reservoir cap, a rotary motor that rotates the finger, and a gripping mechanism equipped with a detection sensor that monitors a front; and a controller recognizing the reservoir cap installed in a reservoir inlet or a reservoir through a detection sensor, controlling the robot arm to move the gripping mechanism to a recognition point, and controlling the cylinder, the finger, and the rotary motor to attach or detach the reservoir cap to or from the reservoir inlet.

17 Claims, 7 Drawing Sheets

(51) Int. Cl.
*B25J 15/00* (2006.01)
*B25J 15/10* (2006.01)
*B25J 19/02* (2006.01)
*B60S 5/00* (2006.01)

(52) U.S. Cl.
CPC ............ *B25J 15/10* (2013.01); *B25J 19/023* (2013.01); *B60S 5/00* (2013.01); *G05B 2219/40613* (2013.01)

(56) References Cited

U.S. PATENT DOCUMENTS

| | | | |
|---|---|---|---|
| 2017/0080576 A1* | 3/2017 | Abdallah | B25J 9/1015 |
| 2017/0369833 A1* | 12/2017 | Kamiya | C12M 23/46 |
| 2022/0063111 A1* | 3/2022 | Wong | B25J 11/0085 |
| 2022/0410406 A1* | 12/2022 | Jung | B25J 15/024 |
| 2023/0123587 A1* | 4/2023 | Jatt | B67D 7/0401 |
| | | | 701/23 |

* cited by examiner

AUTOMATIC REMOVAL SYSTEM FOR RESERVOIR CAP

CROSS REFERENCE TO RELATED APPLICATION

The present application is based on and claims under 35 U.S.C. § 119 (a) the benefit of Korean Patent Application No. 10-2021-0183978, filed Dec. 21, 2021, the entire contents of which are incorporated herein for all purposes by this reference.

TECHNICAL FIELD

Embodiments of the present disclosure relate to an automatic removal system for a reservoir cap. More particularly, Embodiments of the present disclosure relate to an automatic removal system for a reservoir cap, which quantitatively controls an entire opening or closing operation in which a removal robot recognizes a reservoir inlet and a reservoir cap and attaches or detaches the reservoir cap to or from the reservoir inlet, thus minimizing a defect in liquid injection quality, saving man-hours, and maintaining a uniform liquid injection quality by checking a liquid injection amount when liquid injection is completed.

DESCRIPTION OF THE RELATED ART

An internal combustion engine of a vehicle generates required kinetic energy as well as thermal energy while going through the process of a four-stroke cycle. It is very important to eliminate heat generated by the engine and thereby maintain an appropriate temperature, or a brake system for the vehicle is very important to utilize energy as efficiently as possible.

Therefore, a cooling system or a brake system is very important in the vehicle. As fluid used for cooling in the cooling system, coolant as well as brake liquid required for braking in the brake system is provided in a reservoir.

Typically, a series of processes such as vacuum generation required for injecting coolant or brake liquid, leak check, and TOP-OFF are automatically performed. On the other hand, all of the process of injecting liquid into the reservoir, the process of mounting an injection gun, and the removal of the reservoir cap, and the opening and closing of the reservoir cap may be manually performed by workers.

The foregoing is intended merely to aid in the understanding of the background of the present disclosure, and is not intended to mean that the present disclosure falls within the purview of the related art that is already known to those skilled in the art.

SUMMARY

Accordingly, embodiments of the present disclosure have been made keeping in mind the above problems occurring in the related art, and an objective of embodiments of the present disclosure is to provide an automatic removal system for a reservoir cap, which quantitatively controls an entire opening or closing operation in which a removal robot recognizes a reservoir inlet and a reservoir cap and attaches or detaches the reservoir cap to or from the reservoir inlet, thus minimizing a defect in liquid injection quality, saving man-hours, and maintaining a uniform liquid injection quality by checking a liquid injection amount when liquid injection is completed.

In one aspect, an automatic removal system for a reservoir cap, comprising: (a) a removal robot comprising (i) a polyarticular robot arm, (ii) an engagement element associated with the robot, and (iii) a gripping mechanism equipped with a detection sensor that is configured to monitor a front; and (b) a controller configured to (i) recognize the reservoir cap installed in a reservoir inlet or a reservoir through a detection sensor. (ii) control the robot arm to move the gripping mechanism to a recognition point, and (iii) control the cylinder, the finger, and the rotary motor to attach or detach the reservoir cap to or from the reservoir inlet. In one embodiment, the engagement element comprises a finger is installed at an end of the robot arm to move forwards and backwards through a cylinder and grips or releases the reservoir cap. In a further embodiment, the removal system suitably includes a rotary motor, such as a rotary motor that can move, rotate or otherwise articulate the engagement element (e.g. finger).

In a further aspect, an automatic removal system for a reservoir cap is provided, wherein the removal system suitably comprises including a removal robot including a polyarticular robot arm, a finger that is installed at an end of the robot arm to move forwards and backwards through a cylinder and grips or releases the reservoir cap, a rotary motor that rotates the finger, and a gripping mechanism equipped with a detection sensor that is configured to monitor a front; and a controller configured to recognize the reservoir cap installed in a reservoir inlet or a reservoir through a detection sensor, control the robot arm to move the gripping mechanism to a recognition point, and control the cylinder, the finger, and the rotary motor to attach or detach the reservoir cap to or from the reservoir inlet.

The removal robot may be a cooperation robot including a plurality of robot arms and a plurality of links.

The removal robot may include a plurality of fingers, an attaching part composed of a finger driving part that drives the fingers to grip or release the reservoir cap, and a fixing part including the cylinder, the rotary motor, and a base.

The detection sensor may be provided on a side of the base to monitor the front.

The base may be connected to the cylinder through a spring damper to form a suspension structure.

The detection sensor may include a vision camera that is configured to detect position data of the reservoir inlet and opening or closing of the reservoir cap, and a sensor camera that is configured to detect a liquid injection amount.

The vision camera may be configured to detect a shape of the reservoir inlet, and the position data of the reservoir inlet including x-axis and y-axis position compensation values of the reservoir inlet.

The sensor camera may be configured to detect the liquid injection amount by comparing a distance between a surface of injected liquid and the sensor camera or by comparing an appearance of a translucent reservoir into which liquid is injected.

The plurality of fingers may be installed to be spaced apart from each other in a circumferential direction, the reservoir cap may be gripped when the fingers come near to each other, and the reservoir cap may be released when the fingers move away from each other.

The gripping mechanism may be connected to an end of the removal robot, and the gripping mechanism may be vertically moved through the cylinder.

The cylinder may be operated in a hydraulic method or in a ball-screw fastening method.

The controller may be configured to calculate a torque value required for opening or closing the reservoir cap and may be configured to perform a control operation such that the reservoir cap is attached to or detached from the inlet by rotating the rotary motor and gripping the finger based on the torque value.

The controller may be configured to variably control a driving force of the finger driving part depending on a diameter of the reservoir cap.

The controller may be configured to monitor the torque value of the removal robot and the rotating angle of the rotary motor in real time when the reservoir cap is attached to or detached from the reservoir inlet.

The detection sensor may be configured to check whether the reservoir cap is attached when the control operation of the controller is completed and the removal robot moves to an initial position, and the controller may be configured to control the removal robot to attach the reservoir cap when the upper surface of the reservoir cap is not parallel to the upper and lower surfaces of the reservoir.

An automatic removal system for a reservoir cap according to the present disclosure is advantageous in that it quantitatively controls an entire opening or closing operation in which a removal robot recognizes a reservoir inlet and a reservoir cap and attaches or detaches the reservoir cap to or from the reservoir inlet, thus minimizing a defect in liquid injection quality, saving man-hours, and maintaining a uniform liquid injection quality by checking a liquid injection amount when liquid injection is completed.

As discussed, the method and system suitably include use of a controller or processer.

In another aspect, vehicles are provided that comprise an apparatus as disclosed herein.

Effects to be obtained from the present disclosure are not limited to the above-mentioned effects, and other effects which are not mentioned will be clearly understood by those skilled in the art to which the present disclosure pertains, from the following description.

BRIEF DESCRIPTION OF THE DRAWINGS

The above and other objectives, features, and other advantages of the present disclosure will be more clearly understood from the following detailed description when taken in conjoint with the accompanying drawings, in which.

DETAILED DESCRIPTION

Specific structural or functional descriptions in the embodiments of the present disclosure disclosed in this specification or application are only for description of the embodiments of the present disclosure. The descriptions should not be construed as being limited to the embodiments described in the specification or application.

Since the present disclosure may be embodied in many different forms, particular embodiments will be illustrated in the drawings and be described in detail herein. However, it is to be understood that the present description is not intended to limit the present disclosure to those exemplary embodiments, and the present disclosure is intended to cover not only the exemplary embodiments, but also various alternatives, modifications, equivalents and other embodiments that fall within the spirit and scope of the present disclosure.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM. RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a preferred embodiment of the present disclosure will be described in detail with reference to the accompanying drawings. Like reference numerals denote like components throughout the drawings.

Figure 1:
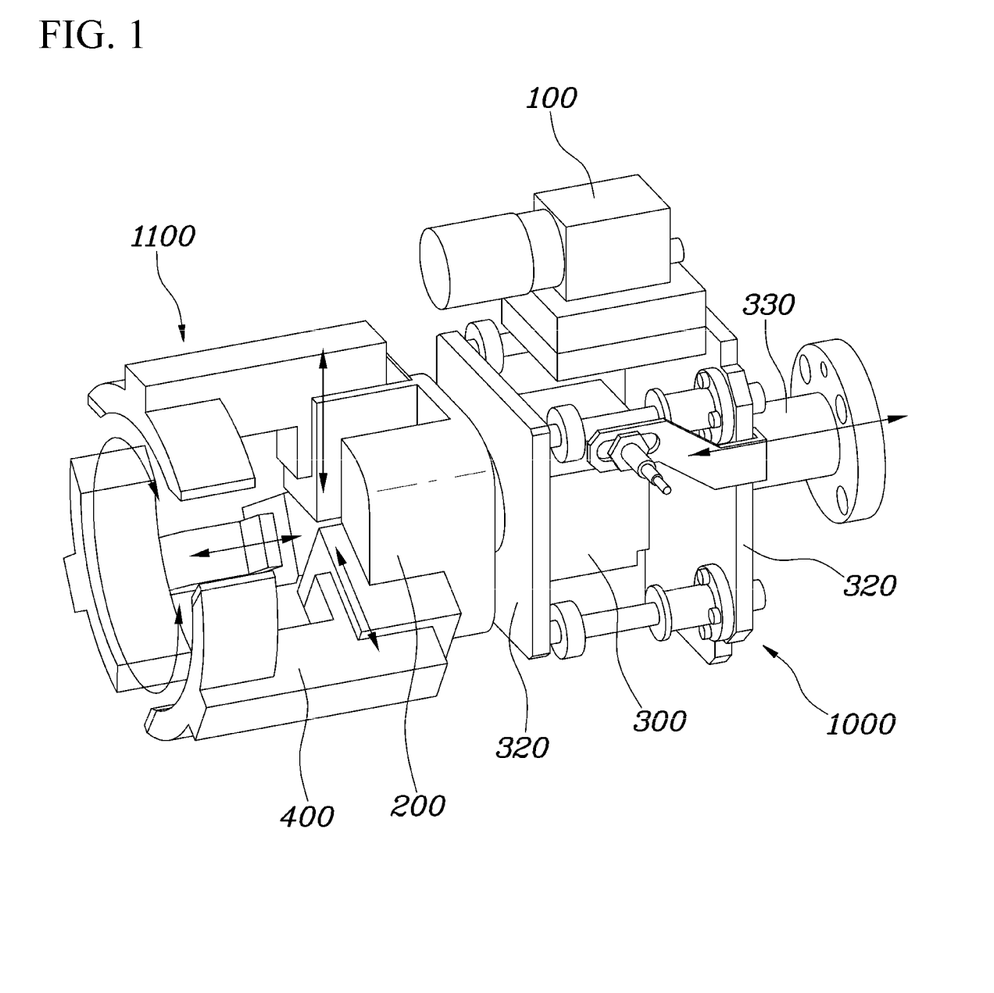
FIG. 1 is a diagram illustrating an automatic removal system for a reservoir cap according to an exemplary embodiment of the present disclosure.
Figure 2:
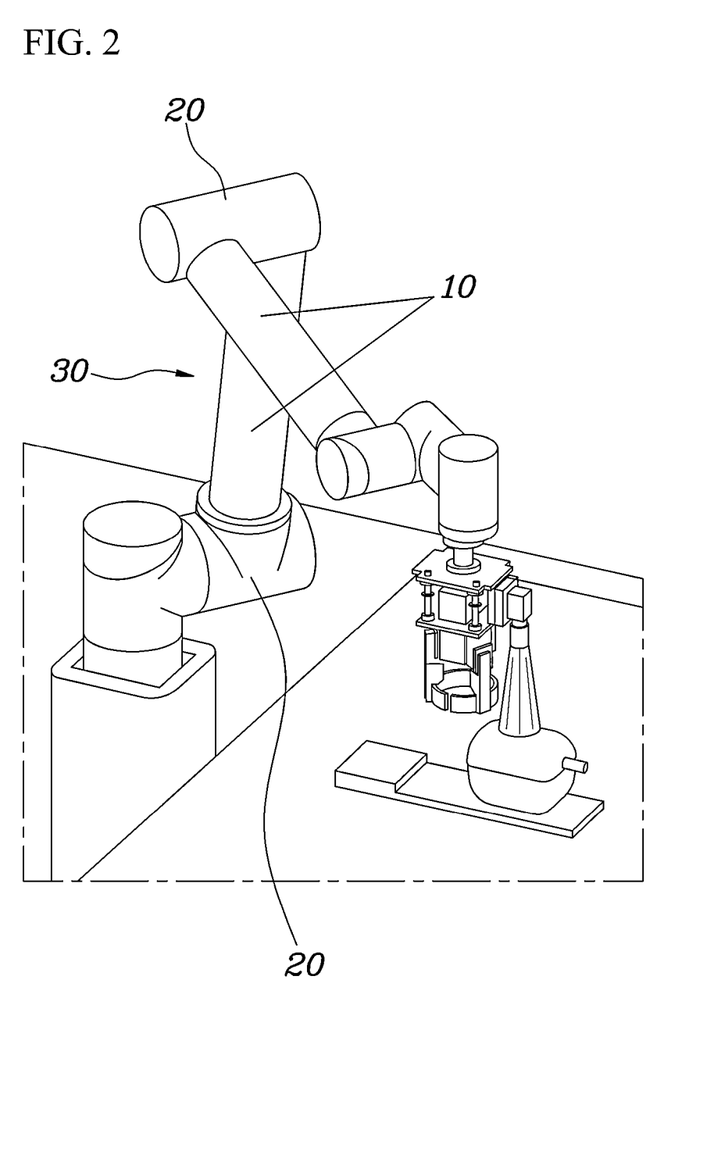
FIG. 2 is a diagram illustrating a removal robot including a plurality of robot arms and a plurality of links in the automatic removal system for the reservoir cap.
Figure 3:
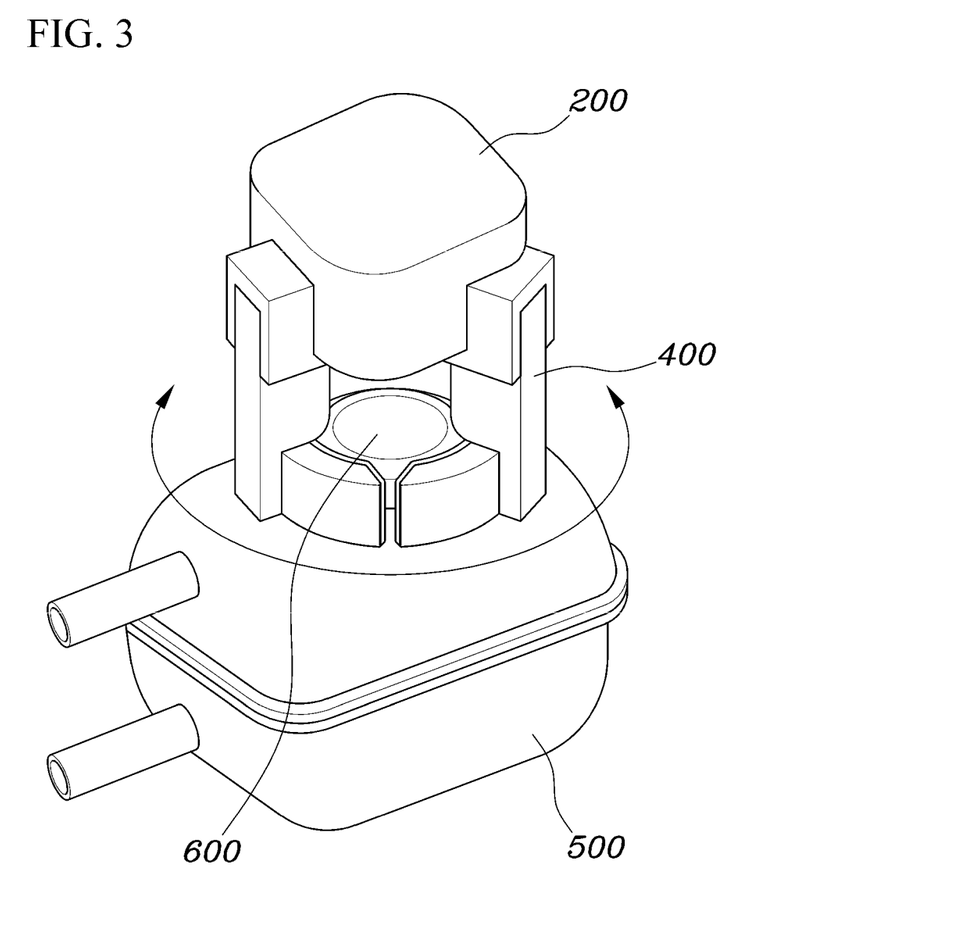
FIG. 3 is a diagram illustrating the operation of a finger for controlling the opening or closing of the reservoir cap through a controller.
Figure 4:
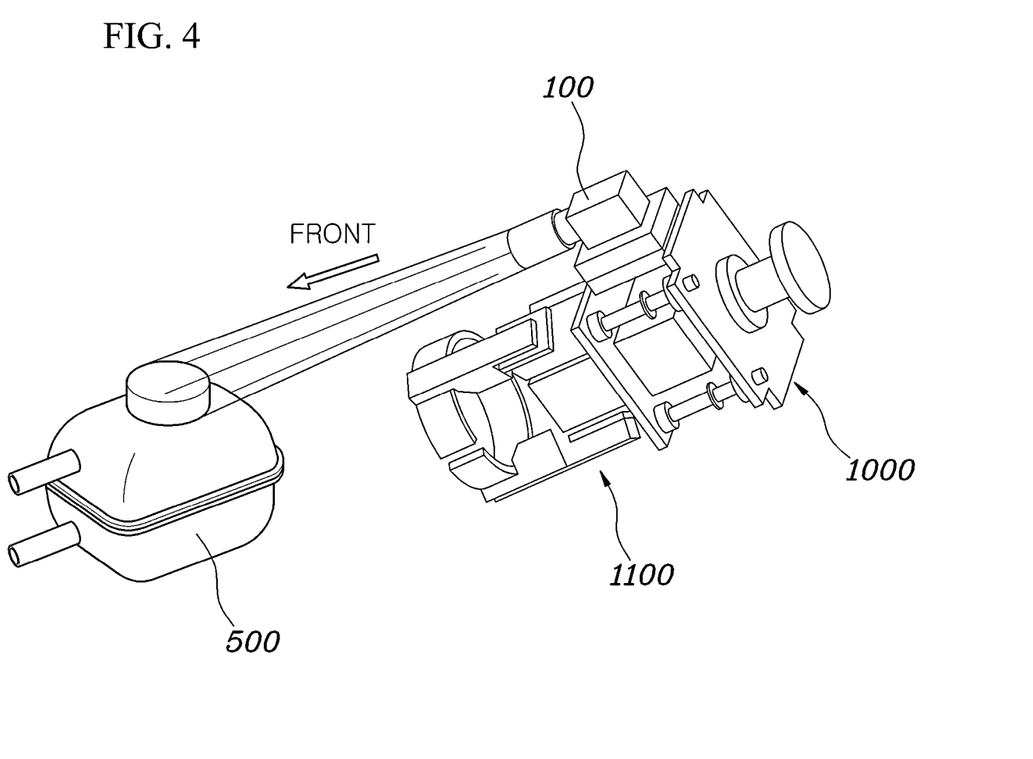
FIG. 4 is a diagram illustrating a vision camera which detects the position data of a reservoir inlet and the opening or closing of the reservoir cap.
Figure 5:
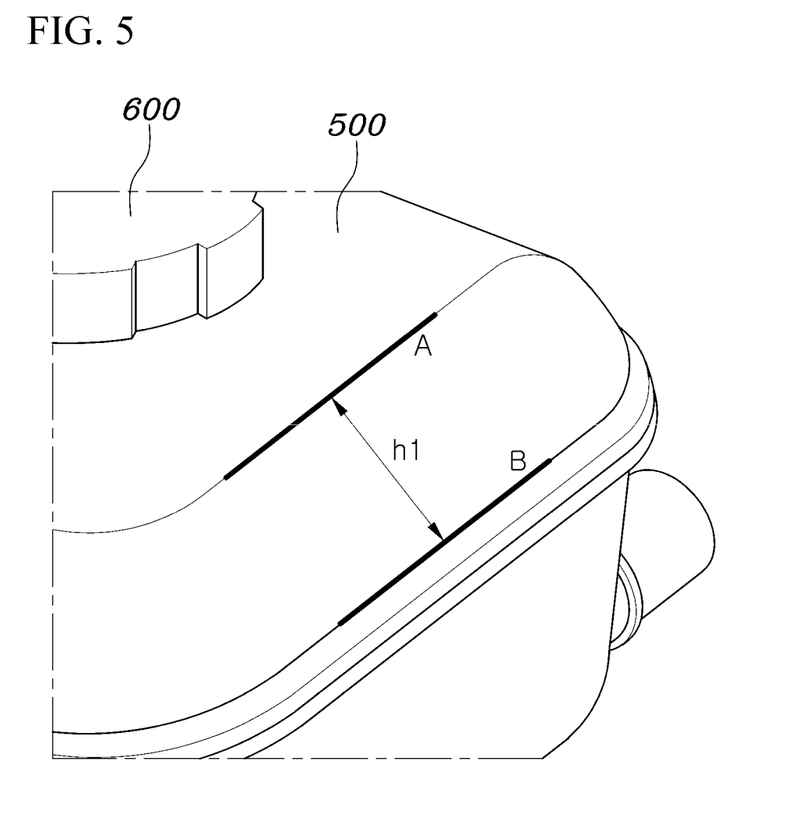
FIGS. 5 and 6 are diagrams illustrating the detection of a liquid injection amount by comparing a distance between the surface of injected liquid and a sensor camera or by comparing the appearance of a translucent reservoir into which liquid is injected, through the sensor camera.
Figure 6:
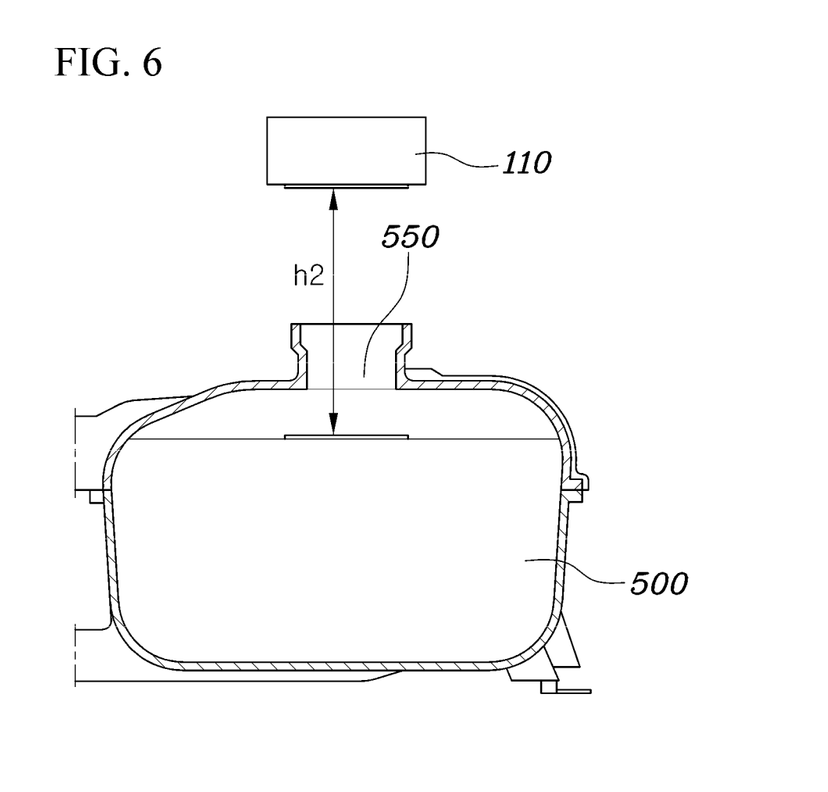
Figure 7:
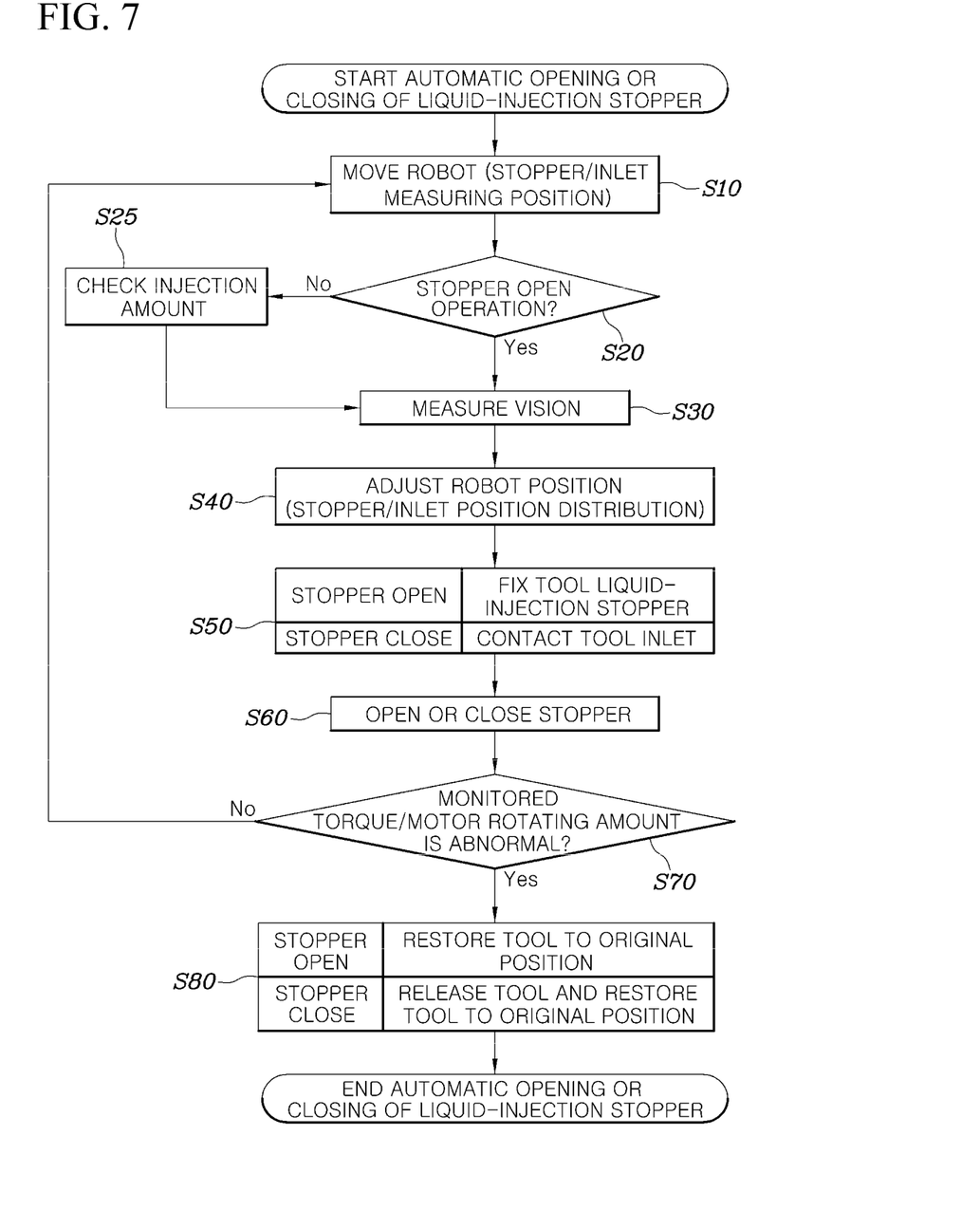
FIG. 7 is a flowchart illustrating the operation of the automatic removal system for the reservoir cap of FIG. 1.

FIG. 1 is a diagram illustrating an automatic removal system for a reservoir cap according to an exemplary embodiment of the present disclosure. FIG. 2 is a diagram illustrating a removal robot including a plurality of robot arms and a plurality of links in the automatic removal system for the reservoir cap. FIG. 3 is a diagram illustrating the operation of a finger for controlling the opening or closing of the reservoir cap through a controller. FIG. 4 is a diagram illustrating a vision camera which detects the position data of a reservoir inlet and the opening or closing of the reservoir cap. FIGS. 5 and 6 are diagrams illustrating the detection of a liquid injection amount by comparing a distance between the surface of injected liquid and a sensor camera or by comparing the appearance of a translucent reservoir into which liquid is injected, through the sensor camera. FIG. 7 is a flowchart illustrating the operation of the automatic removal system for the reservoir cap of FIG. 1.

FIG. 1 is a diagram illustrating an automatic removal system for a reservoir cap according to an exemplary embodiment of the present disclosure.

Referring to FIG. 1, the automatic removal system for the reservoir cap may include a removal robot 30 and a controller. The removal robot may include a polyarticular robot arm 10, a finger 400 that is installed at an end of the robot arm 10 to move forwards and backwards through a cylinder 330 and grips or releases a reservoir cap 600, a rotary motor 300 that rotates the finger 400, and a gripping mechanism equipped with a detection sensor that monitors a front. The controller may recognize the reservoir cap 600 installed in a reservoir inlet 550 or a reservoir 500 through a detection sensor, control the robot arm 10 to move the gripping mechanism to a recognition point, and control the cylinder 330, the finger 400, and the rotary motor 300 to attach or detach the reservoir cap 600 to or from the reservoir inlet 550.

According to embodiments of the present disclosure, the removal robot 30 may quantitatively control the entire opening or closing operation of recognizing the reservoir inlet 550 and the reservoir cap 600 and attaching or detaching the reservoir cap 600 to or from the reservoir inlet 550, thus minimizing a defect in liquid injection quality, saving man-hours, and maintaining a uniform liquid injection quality by checking a liquid injection amount when liquid injection is completed. Since all of the process of injecting liquid into the reservoir 500, the process of mounting the injection gun, the removal of the reservoir cap 600, and the opening or closing of the reservoir cap 600 may be manually performed by workers in many cases, work efficiency may be significantly reduced. In order to solve the problem, if the attachment or detachment of the reservoir cap 600 to or from the reservoir inlet 550 is automated in the reservoir 500 in which the coolant or brake liquid of a vehicle is stored, work efficiency may be increased. Therefore, in order to automate the automatic removal system for the reservoir cap, it is most important that the reservoir cap 600 is fixed through the removal robot 30 and the reservoir cap 600 is precisely attached or detached to or from the reservoir inlet 550.

Specifically, the removal robot 30 may include the polyarticular robot arm 10, the finger 400 that is installed at the end of the robot arm 10 to be movable forwards and backwards through the cylinder 330 and may grip or release the reservoir cap 600, the rotary motor 300 that rotates the finger 400, and the gripping mechanism equipped with the detection sensor that monitors the front.

Referring to FIG. 2, the removal robot 30 may be a cooperation robot including a plurality of robot arms 10 and a plurality of links 20. The plurality of robot arms 10 and the plurality of links 20 may be provided to freely move the gripping mechanism to a preset location in all directions. The reservoir cap 600 may be attached to or detached from the reservoir inlet 550 through the finger 400, and the finger 400 may grip or release the reservoir cap 600. The finger 400 may be supplied with a driving force through a finger driving part 200 and requires a moderate driving force to grip or release the reservoir cap 600.

To be more specific, the removal robot 30 may include a plurality of fingers 400, an attaching part 1100 including the finger driving part 200 that drives the fingers 400 to grip or release the reservoir cap 600, and a fixing part 1000 including the cylinder 330, the rotary motor 300, and a base 320. In a configuration from the removal robot 30 to the gripping mechanism, the fixing part 1000 provided on a rear may be provided with the cylinder 330 that enables the gripping mechanism to move forwards and backwards. Furthermore, the attaching part 1100 provided on a front may include the finger driving part 200 and the finger 400, starting from a portion where it meets the fixing part 1000. The finger driving part 200 may drive the finger 400 to grip or release the reservoir cap 600, and the finger 400 may function to attach or detach the reservoir cap 600.

At this time, the cylinder 330 may be connected to the base 320 through a spring damper. The base 320 may form a suspension structure with the cylinder 330 through the spring damper, and the rotary motor 300 may be provided in the internal space of the base 320. If the spring damper is disposed, the controller may control the cylinder 330, the finger 400, and the rotary motor 300, thus preventing shakes from external impact when the reservoir cap 600 is attached to or detached from the reservoir inlet 550. Further, the rotary motor 300 may rotate the reservoir cap 600 clockwise or counterclockwise so that the finger 400 may attach or detach the reservoir cap 600 to or from the reservoir inlet 550.

Further, the cylinder 330 may be operated in a hydraulic method or in a ball-screw fastening method and may transmit a strong force to the gripping mechanism through the hydraulic method in which force and momentum are controlled by hydrodynamics to transmit power.

If the cylinder 330 may be movable forwards and backwards in the ball-screw fastening method, it is advantageous in that transfer efficiency is good and it is unnecessary to pay much attention to lubrication. Thus, the gripping mechanism may be connected to the end of the removal robot 30 to attach or detach the reservoir cap 600 to or from the reservoir inlet 550, and the gripping mechanism may be vertically moved through the cylinder 330. In summary, the finger 400 may be movable forwards and backwards through the cylinder 330, the finger 400 may be rotatable through the rotary motor 300, and the finger 400 may grip or release the reservoir cap 600 through the finger driving part 200.

When the finger 400 grips or releases the reservoir cap 600 through the finger driving part 200, the plurality of fingers 400 may be installed to be spaced apart from each other in a circumferential direction. When the fingers 400 come near to each other, the reservoir cap 600 may be gripped. When the fingers 400 move away from each other, the reservoir cap 600 may be released. As shown in FIG. 1, the plurality of fingers 400 may be arranged at regular intervals while forming the angle of 120 degrees. The number of the fingers 400 is not limited to three, and the plurality of fingers 400 may be provided according to the shape of the reservoir cap 600.

Furthermore, the detection sensor may be provided on a side of the base 320 to monitor the front. Since the detection sensor should recognize the reservoir cap 600 installed in the reservoir inlet 550 or the reservoir 500 by monitoring the front of the finger 400, it is proper that the detection sensor is provided on the side of the base 320 excluding a portion where the finger 400 is operated, without being limited to the side of the base 320.

FIG. 4 is a diagram illustrating a vision camera 100 which detects the position data of the reservoir inlet 550 and the opening or closing of the reservoir cap 600. Furthermore, FIGS. 5 and 6 are diagrams illustrating the detection of a liquid injection amount by comparing a distance between the surface of injected liquid and a sensor camera 110 or by comparing the appearance of a translucent reservoir 500 into which liquid is injected, through the sensor camera 110.

Referring to FIGS. 4 to 6, the detection sensor may be composed of the vision camera 100 that detects the position data of the reservoir inlet 550 and the opening or closing of the reservoir cap 600, and the sensor camera 110 that detects the liquid injection amount. As shown in FIG. 4, the vision camera 100 may be configured to recognize the reservoir cap 600 installed in the reservoir inlet 550 or the reservoir 500 before the controller controls the robot arm 10 to move the gripping mechanism to a recognition point.

In order to move the reservoir cap 600 to the reservoir inlet 550, it is necessary to obtain the position data of the reservoir inlet 550 and to detect the opening or closing of the reservoir cap 600 through the vision camera 100. Specifically, the vision camera 100 may detect the shape of the reservoir inlet 550, and the position data of the reservoir inlet 550 including the x-axis and y-axis position compensation values of the reservoir inlet 550. Since the reservoir cap 600 is attached to or detached from the reservoir inlet 550 through the rotary motion of the reservoir cap 600, a position compensation value from the reservoir cap 600 to the reservoir inlet 550 may be calculated by determining the size and shape of the reservoir inlet 550 and the x-axis and y-axis positions of the inlet.

Furthermore, the sensor camera 110 may detect the liquid injection amount by comparing the distance between the surface of injected liquid and the sensor camera 110 or by comparing the appearance of the translucent reservoir 500 into which liquid is injected. One of two methods for detecting the amount of liquid injected into the reservoir 500 by the sensor camera 110 is to compare the distance between the surface of the injected liquid and the sensor camera 110. Referring to FIG. 6, this may be compared through the sensor camera 110 as well as the vision camera 100, and the distance between liquid in the reservoir inlet 550 and the camera may be compared through the sensor camera 110 that may measure a distance. As the distance between the liquid in the reservoir inlet 550 and the camera increases, it may be determined that the amount of liquid injected into the reservoir 500 is small. As the distance decreases, it may be determined that the liquid injection amount is large.

The second method is to compare the appearance of the translucent reservoir 500 into which liquid is injected. Specifically, referring to FIG. 5, the translucent reservoir 500 may be measured by the camera, and then be measured through image processing. Since the reservoir 500 is translucent, it may be determined that the amount of liquid injected into the reservoir 500 is large as a length to a pass set value increases based on a reference set value. Meanwhile, as the length decreases, it may be determined that the liquid injection amount is small.

Further, the controller may calculate a torque value required for opening or closing the reservoir cap 600 and may perform a control operation such that the reservoir cap 600 is attached to or detached from the inlet by rotating the rotary motor 300 and gripping the finger 400 based on the torque value. Referring to FIG. 3, it can be seen that the controller should apply torque such that the finger 400 grips or releases the reservoir cap 600 through the finger driving part 200, thus allowing the reservoir cap 600 to be attached to or detached from the reservoir inlet 550. The torque value does not exceed a reference value so as to prevent the reservoir cap 600 from being damaged. Furthermore, in order to attach or detach the reservoir cap 600 to or from the reservoir inlet 550, it is necessary to rotate the reservoir cap by predetermined angles so that the reservoir cap 600 is completely fixed to or released from the reservoir inlet 550.

Further, the controller may variably control the driving force of the finger driving part 200 depending on the diameter of the reservoir cap 600. A coolant inlet or a brake inlet that is the inlet of the reservoir 500 in which the coolant or brake liquid of the vehicle is stored has a different diameter. The finger driving part 200 may variably control the driving force of gripping or releasing the reservoir cap 600 having a different diameter when the finger 400 is driven, thus providing a proper torque value and the rotating angle of the rotary motor 300 to each reservoir cap 600, quantitatively controlling the entire opening or closing operation, and consequently minimizing a poor liquid injection quality.

Furthermore, the controller may monitor the torque value of the removal robot 30 and the rotating angle of the rotary motor 300 in real time when the reservoir cap 600 is attached to or detached from the reservoir inlet 550. When it is determined that the torque value of the removal robot 30 exceeds the reference value or the rotating angle of the rotary motor 300 is less than a pass angle number, so abnormality is detected by the controller, the operation is stopped, the reservoir cap 600 is detached, and thereafter the detection sensor provided on the removal robot 30 monitors the front again and then is re-operated, thus minimizing a defect in liquid injection quality.

Furthermore, when a control operation is completed and the removal robot 30 moves to an initial position, the detection sensor may check whether the reservoir cap 600 is attached. When the upper surface of the reservoir cap 600 is not parallel to the upper and lower surfaces of the reservoir 500, the controller may control the removal robot 30 to attach the reservoir cap 600. When the reservoir cap 600 is precisely attached to the reservoir inlet 550, the upper surface of the reservoir cap 600 may be parallel to the upper and lower surfaces of the reservoir 500. When the reservoir cap 600 is not precisely attached to the reservoir inlet 550, the upper surface of the reservoir cap 600 may not be parallel to the upper and lower surfaces of the reservoir 500. Thereby, when it is determined that the upper surface of the reservoir cap 600 is not parallel to the upper and lower surfaces of the reservoir 500, the reservoir cap 600 may be opened or closed again. When the upper surface of the reservoir cap 600 is parallel to the upper and lower surfaces of the reservoir 500, it may be determined that the opening or closing is completed.

FIG. 7 is a flowchart illustrating the operation of the automatic removal system for the reservoir cap of FIG. 1.

Referring to FIG. 7, the method of automatically removing the reservoir cap may include a step S20 of determining whether the reservoir cap 600 is opened or closed; a step S40 of controlling the robot arm 10 to move the gripping mechanism to the recognition point; a step S60 of controlling the cylinder 330, the finger 400, and the rotary motor 300 to attach or detach the reservoir cap 600 to or from the reservoir inlet 550; and a step S70 of monitoring the torque value of the removal robot 30 and the rotating angle of the rotary motor 300 in real time when the reservoir cap 600 is attached to or detached from the reservoir inlet 550.

Since the detailed technical features in each step of the method of automatically removing the reservoir cap according to embodiments of the present disclosure are equal or similar to the technical features of each configuration in the automatic removal system for the reservoir cap according to embodiments of the present disclosure, a detailed description thereof will be omitted.

Prior to the step S20 of determining whether the reservoir cap 600 is opened or closed, the method may further include a step S10 of moving the removal robot 30 close to the position of the reservoir inlet 550.

At the step S20 of determining whether the reservoir cap 600 is opened or closed, the method may further include a step S25 of checking the amount of liquid injected into the reservoir 500 when it is determined that the reservoir cap 600 is detached.

When it is determined that the reservoir cap 600 is attached at the step S20 of determining whether the reservoir cap 600 is opened or closed, the method may further include a step S30 of detecting the shape of the reservoir inlet 550 and the position data of the reservoir inlet 550 including the x-axis and y-axis position compensating values of the reservoir inlet 550 through the vision camera 100.

After the step S40 of controlling the robot arm 10 to move the gripping mechanism to the recognition point, the method may further include a step S50 of fixing the finger 400 or moving the finger to the reservoir inlet 550 depending on whether the reservoir cap 600 is opened or closed.

After the step S70 of monitoring the torque value of the removal robot 30 and the rotating angle of the rotary motor 300, the method may further include a step S80 of stopping the operation, detaching the reservoir cap 600, and thereafter monitoring the front again by the detection sensor provided on the removal robot 30 and then re-operating the detection sensor, when it is determined that the torque value of the removal robot 30 exceeds the reference value or the rotating angle of the rotary motor 300 is less than the pass angle number, so abnormality is detected by the controller.

As described above, embodiments of the present disclosure provide an automatic removal system for a reservoir cap, which quantitatively controls an entire opening or closing operation in which a removal robot recognizes a reservoir inlet and a reservoir cap and attaches or detaches the reservoir cap to or from the reservoir inlet, thus minimizing a defect in liquid injection quality, saving man-hours, and maintaining a uniform liquid injection quality by checking a liquid injection amount when liquid injection is completed.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. An automatic removal system for a reservoir cap, comprising:
   a removal robot comprising:
      a polyarticular robot arm, and
      a gripping mechanism equipped with an engagement element associated with the robot and a detection sensor that is configured to monitor an area in front of the gripping mechanism; and
   a controller configured to:
      recognize the reservoir cap installed in a reservoir inlet or a reservoir through the detection sensor,
      control the robot arm to move the gripping mechanism to a recognition point, and
      control a cylinder, a finger, and a rotary motor of the removal robot to attach or detach the reservoir cap to or from the reservoir inlet;
   wherein the detection sensor comprises:
      a vision camera that is configured to:
         detect position data of the reservoir inlet and opening or closing of the reservoir cap; and
         detect a shape of the reservoir inlet;
         wherein the position data of the reservoir inlet includes x-axis and y-axis position compensation values of the reservoir inlet; and
      a sensor camera that is configured to detect a liquid injection amount by comparing a distance between a surface of injected liquid and the sensor camera.

2. The system of claim 1 wherein the engagement element comprises the finger and is installed at an end of the robot arm to move forwards and backwards through the cylinder and grips or releases the reservoir cap.

3. The system of claim 2 further comprising the rotary motor that rotates the finger.

4. The system of claim 1 further comprising the rotary motor.

5. The system of claim 1, wherein the removal robot is a cooperation robot comprising a plurality of links and a plurality of joints.

6. The system of claim 1, wherein the removal robot comprises a plurality of fingers, an attaching part composed of a finger driving part that is configured to drive the fingers to grip or release the reservoir cap, and a fixing part including the cylinder, the rotary motor, and a base.

7. The system of claim 6, wherein the detection sensor is provided on a side of the base to monitor the front.

8. The system of claim 6, wherein the base is connected to the cylinder through a spring damper to form a suspension structure.

9. The system of claim 6, wherein the controller is further configured to variably control a driving force of the finger driving part depending on a diameter of the reservoir cap.

10. The system of claim 1, wherein the sensor camera is further configured to detect the liquid injection amount by comparing an appearance of a translucent reservoir into which liquid is injected.

11. The system of claim 1, wherein the plurality of fingers are installed to be spaced apart from each other in a circumferential direction; the reservoir cap is gripped when the fingers come near to each other; and the reservoir cap is released when the fingers move away from each other.

12. The system of claim 1, wherein the gripping mechanism is connected to an end of the removal robot; and the gripping mechanism is vertically moved through the cylinder.

13. The system of claim 1, wherein the cylinder is operated in a hydraulic method or in a ball-screw fastening method.

14. The system of claim 1, wherein the controller is further configured to calculate a torque value required for opening or closing the reservoir cap and perform a control operation such that the reservoir cap is attached to or detached from the inlet by rotating the rotary motor and gripping the finger based on the torque value.

15. The system of claim 1, wherein the controller is further configured to monitor the torque value of the removal robot and the rotating angle of the rotary motor in real time when the reservoir cap is attached to or detached from the reservoir inlet.

16. The system of claim 1, wherein the detection sensor is further configured to check whether the reservoir cap is attached when the control operation of the controller is completed, and the removal robot moves to an initial position; and the controller is further configured to control the removal robot to attach the reservoir cap when the upper surface of the reservoir cap is not parallel to the upper and lower surfaces of the reservoir.

17. A vehicle comprising the system of claim 1.

\* \* \* \* \*